Patented Apr. 28, 1936

2,039,023

UNITED STATES PATENT OFFICE 2,039,023

PROCESS OF PRODUCING NEW DYESTUFFS OF THE ANTHRAQUINONE SERIES

Paul Nawiasky and Rudolf Robl, Ludwigshafen-on-the-Rhine, Germany, assignors to General Aniline Works, Inc., New York, N. Y., a corporation of Delaware No Drawing. Application October 23, 1934, Serial No. 749,671. In Germany November 1, 1933

9 Claims. (Cl. 260—59)

The present invention relates to new dyestuffs of the anthraquinone series and a process of producing same.

We have found that new dyestuffs of the anthraquinone series can be obtained by alkylating para-diaminochrysazine, which has the formula:

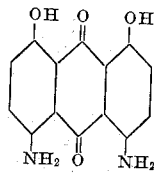

under such conditions as regards the period of reaction, the concentration of the reagents and the temperature that the amino groups are only partially alkylated. The period of reaction is generally between about one hour and about five hours. The best reaction-temperature is between about 100° and 160° C. The end of the reaction can readily be ascertained by working up a sample of the reaction mixture and dissolving it in a mixture of benzoyl chloride and benzene (1:5). The reaction is finished when two of the bands present in the absorption spectrum of the starting material have almost or just entirely disappeared. The solution of the new dyestuffs in a mixture of acetic anhydride and boric acid is greenish-blue whereas the solution of the starting materials therein is violet.

Suitable alkylating agents are for example mono- and di-alkyl esters of sulfuric acid, arylsulfonic acid esters, hydroxyalkyl halides and alkylene oxides. Instead of the monomethylester of sulfuric acid a mixture of methanol and sulfuric acid may be employed.

The new dyestuffs which are obtained in good yields are especially suitable for dyeing cellulose esters and ethers and may also be employed as intermediate products for the preparation of other dyestuffs.

The following examples will further illustrate how the said invention may be carried out in practice but the invention is not restricted to these examples. The parts are by weight.

Example 1

750 parts of methanol are gradually added while stirring to a solution of 500 parts of para-diaminochrysazine in 2000 parts of 96 per cent sulfuric acid, the temperature preferably being kept below 60° C. The reaction mixture is then heated, for example up to about 140° C., until a sample withdrawn and worked up dissolves in a mixture of benzoyl chloride and trichlorbenzene (1:5) giving a blue violet solution and the solution in a mixture of benzoyl chloride and benzene (1:5) gives a spectrum in which two of the characteristic absorption bands of the initial material in the same solvent mixture have almost or entirely disappeared. This is usually the case after heating for about 4 hours. The reaction mixture is then poured onto ice, the precipitate filtered off by suction, washed and worked up into a dyestuff paste in the usual manner.

The resulting dyestuff which is most probably a mixture of para-amino-monomethylamino-chrysazine and para-di(monomethylamino)-chrysazine dissolves in concentrated sulfuric acid giving a yellow coloration which after the addition of boric acid turns ruby without a fluorescence effect. It dyes acetate artificial silk clear blue shades of great color strength.

Example 2

5 parts of para-diaminochrysazine are heated at from 130° to 150° C. with 50 parts of monomethyl sulfate until a sample withdrawn and worked up has the properties described in Example 1. The solution is then poured into ice-cold water and the precipitated dyestuff is filtered off by suction and washed with water until neutral.

Example 3

A mixture of 10 parts of para-diaminochrysazine, 100 parts of ortho-dichlorbenzene, 10 parts of potash and 4 parts of dimethyl sulfate is heated to boiling while stirring under reflux until a sample withdrawn and worked up has the properties described in Example 1. After neutralization of the excess potassium carbonate, the ortho-dichlorbenzene is expelled by distillation with steam and the dyestuff is filtered off by suction, washed until neutral and worked up into a paste.

Example 4

A mixture of 10 parts of para-diaminochrysazine, 100 parts of ortho-dichlorbenzene, 15 parts of potassium carbonate and 20 parts of diethyl sulfate is heated to boiling while stirring under reflux until a sample withdrawn and worked up reacts in a similar manner as described in Example 1. The reaction mixture is then worked up as described in Example 3.

Example 5

5 parts of para-diaminochrysazine are heated to boiling in a vessel provided with a stirrer and a reflux condenser with 100 parts of trichlorbenzene, 5 parts of soda and 5 parts of toluene sulfonic acid butyl ester until a sample withdrawn and worked up reacts in a similar manner as described in Example 1. The trichlorbenzene employed is then removed by distillation with steam and the reaction product worked up in the usual manner.

Example 6

10 parts of para-diaminochrysazine are heated to boiling in a suitable vessel with 50 parts of ethylene chlorhydrin and 3 parts of sodium acetate until a sample withdrawn and worked up reacts in a similar manner as described in Example 1. The reaction mixture is then poured into water and the precipitated dyestuff is filtered off by suction, washed and worked up into a dyestuff paste.

Example 7

A mixture of 20 parts of para-diaminochrysazine, 400 parts of ortho-dichlorbenzene, 10 parts of ethylene oxide and 0.5 part of sodium acetate is heated in an autoclave at elevated temperature, as for example from 120° to 150° C., until a sample withdrawn and worked up reacts in a similar manner as described in Example 1. After removing the ortho-dichlorbenzene by steam distillation, the reaction mixture is worked up in the usual manner.

Example 8

5 parts of para-diaminochrysazine are heated to boiling in a vessel provided with a stirrer and a reflux condenser with 100 parts of trichlorbenzene, 5 parts of soda and 5 parts of toluene sulfonic acid methyl ester until a sample withdrawn and worked up reacts in a similar manner as described in Example 1. The trichlorbenzene employed is then removed by distillation with steam and the reaction product worked up in the usual manner.

What we claim is:

1. The process of producing new dyestuffs of the anthraquinone series which comprises alkylating para-diaminochrysazine under such conditions as regards the period of reaction, the concentration of the reagents and the temperature that the amino groups are only partially alkylated, the end of the reaction being ascertained by the fact that a solution of a sample withdrawn, worked up and dissolved in a mixture of benzoyl chloride and benzene (1:5) gives a spectrum in which two of the characteristic absorption bands of the initial material have almost or just entirely disappeared.

2. The process of producing new dyestuffs of the anthraquinone series which comprises alkylating para-diaminochrysazine with a compound selected from the group consisting of mono- and di-alkyl esters of sulfuric acid, aryl-sulfonic acid esters, hydroxy alkyl halides and alkylene oxides under such conditions as regards the period of reaction, the concentration of the reagents and the temperature that the amino groups are only partially alkylated, the end of the reaction being ascertained by the fact that a solution of a sample withdrawn, worked up and dissolved in a mixture of benzoyl chloride and benzene (1:5) gives a spectrum in which two of the characteristic absorption bands of the initial material have almost or just entirely disappeared.

3. The process of producing new dyestuffs of the anthraquinone series which comprises methylating para-diaminochrysazine with a compound corresponding to the formula

wherein one R stands for —O.CH$_3$ and the other R for —OH, —O.CH$_3$ or aryl, the end of the reaction being ascertained by the fact that a solution of a sample withdrawn, worked up and dissolved in a mixture of benzoyl chloride and benzene (1:5) gives a spectrum in which two of the characteristic absorption bands of the initial material have almost or just entirely disappeared.

4. The dyestuffs of the anthraquinone series corresponding to the general formula:

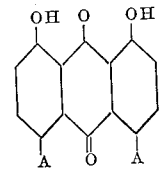

wherein one A stands for an amino group and the other A for an amino group which may contain up to two alkyl groups.

5. The mixture of para-amino-monomethyl-amino-chrysazine and para-di(monomethylamino)-chrysazine.

6. The dyestuffs of the anthraquinone series which are substantially identical with the dyestuffs obtainable according to claim 1.

7. The dyestuffs of the anthraquinone series substantially identical with the dyestuff obtainable by treating para-diaminochrysazine with a mixture of methanol and concentrated sulfuric acid at about 140° C. until a sample worked up and dissolved in a mixture of benzoyl chloride and benzene (1:5) gives a spectrum in which two of the characteristic absorption bands of the initial material in the said solvent mixture have just entirely disappeared.

8. The dyestuffs of the anthraquinone series which are substantially identical with the dyestuff obtainable by boiling para-diaminochrysazine with diethyl sulfate in the presence of a halogen-containing aromatic hydrocarbon until a sample worked up and dissolved in a mixture of benzoyl chloride and benzene (1:5) gives a spectrum in which two of the characteristic absorption bands of the initial material in the said solvent mixture have just entirely disappeared.

9. The dyestuffs of the anthraquinone series which are substantially identical with the dyestuff obtainable by boiling para-diaminochrysazine with ethylene chlorhydrin and a little sodium acetate until a sample worked up and dissolved in a mixture of benzoyl chloride and benzene (1:5) gives a spectrum in which two of the characteristic absorption bands of the initial material in the said solvent mixture have just entirely disappeared.

PAUL NAWIASKY.
RUDOLF ROBL.